United States Patent
Benucci

(10) Patent No.: US 11,129,364 B2
(45) Date of Patent: Sep. 28, 2021

(54) SYSTEM FOR RESTRAINING EXPERIMENTAL ANIMAL

(71) Applicant: RIKEN, Saitama (JP)

(72) Inventor: Andrea Benucci, Saitama (JP)

(73) Assignee: RIKEN, Saitama (JP)

( * ) Notice: Subject to any disclaimer, the term of this patent is extended or adjusted under 35 U.S.C. 154(b) by 0 days.

(21) Appl. No.: 16/670,772

(22) Filed: Oct. 31, 2019

(65) Prior Publication Data

US 2020/0060236 A1   Feb. 27, 2020

Related U.S. Application Data

(63) Continuation of application No. 15/633,116, filed on Jun. 26, 2017, now abandoned.

(51) Int. Cl.
| | |
|---|---|
| A01K 15/04 | (2006.01) |
| A01K 1/03 | (2006.01) |
| A01K 1/06 | (2006.01) |
| A01K 1/00 | (2006.01) |
| A01K 7/06 | (2006.01) |
| A01K 15/02 | (2006.01) |
| A01K 29/00 | (2006.01) |

(52) U.S. Cl.
CPC .............. *A01K 15/04* (2013.01); *A01K 1/00* (2013.01); *A01K 1/031* (2013.01); *A01K 1/0613* (2013.01);
(Continued)

(58) Field of Classification Search
CPC ...... A01M 23/10; A01M 23/04; A01M 23/18; A01M 23/08; A01M 23/16; A01M 23/06;
(Continued)

(56) References Cited

U.S. PATENT DOCUMENTS 2,787,082 A * 4/1957 Paschen ................ A01M 23/14
43/66
6,651,587 B1 * 11/2003 DeFord .................... A61D 3/00
119/420
(Continued)

FOREIGN PATENT DOCUMENTS

JP    2012-061198    3/2012
JP    2013-5746      1/2013
(Continued)

OTHER PUBLICATIONS

Aoki, Ryo et al., Oct. 30, 2017, An automated platform for high-throughput mouse behavior and physiology with voluntary head-fixation, Nature Communications, 8: 1196, 9 pages DOI: 10.1038/s41467-017-01371-0, www.nature.com/naturecommunications.
(Continued)

*Primary Examiner* — Peter M Poon
*Assistant Examiner* — Jeffrey R Larsen
(74) *Attorney, Agent, or Firm* — Casimir Jones, S.C.; Robert A. Goetz

(57) ABSTRACT

A system, of the present invention, for restraining a mouse includes: at least one home cage (10); a passage (20) through which the mouse (60) moves, the passage (20) having at least one first open end (21*a*); and a restraining device (50) which restrains the mouse by physically fixing the mouse (60), the at least one first open end of the passage (21*a*) being connected to the at least one home cage (10), the restraining device (50) being provided at a location on the passage (20) which location is different from the at least one first open end (21*a*) of the passage (20).

7 Claims, 5 Drawing Sheets

(52) U.S. Cl.
CPC .............. *A01K 7/06* (2013.01); *A01K 15/021* (2013.01); *A01K 29/005* (2013.01)

(58) Field of Classification Search
CPC ..... A01M 23/20; A01K 1/0613; A01K 1/031; A01K 1/03; A01K 1/06; A61D 3/00; A61D 2003/003
USPC ........ 119/752, 729, 452, 481; 43/58, 85, 65, 43/64, 66
See application file for complete search history.

(56) References Cited

U.S. PATENT DOCUMENTS

| | | | |
|---|---|---|---|
| 2011/0083614 A1* | 4/2011 | Chen | A61D 3/00 119/729 |
| 2011/0168107 A1 | 7/2011 | Yaniv et al. | |
| 2012/0180731 A1* | 7/2012 | Garner | A01K 1/031 119/417 |

FOREIGN PATENT DOCUMENTS

| | | |
|---|---|---|
| JP | 3184937 | 7/2013 |
| JP | 2015-65939 | 4/2015 |

OTHER PUBLICATIONS

Office Action for Japanese Patent Application No. 2016-129406, dated Oct. 30, 2018, 9 pages.

Office Action for U.S. Appl. No. 15/633,116, dated May 1, 2019, 18 pages.

Scott et al., "Cellular resolution functional imaging in behaving rats using voluntary head restraint" Neuron. Oct. 16, 2013; 80(2):371-384.

* cited by examiner

SYSTEM FOR RESTRAINING EXPERIMENTAL ANIMAL

CROSS-REFERENCE TO RELATED APPLICATIONS

The present invention is a continuation of U.S. patent application Ser. No. 15/633,116, filed Jun. 26, 2017 which claims priority to Japanese Patent Application 2016-129406, filed Jun. 29, 2016

TECHNICAL FIELD

The present invention relates to a system for restraining a mouse used as an experimental animal or the like.

BACKGROUND ART

Mice and rats are experimental animals that are widely used in various kinds of research ranging from the field of basic science to the field of applied science. Both mice and rats have characteristics desirable as experimental animals (e.g., both mice and rats are easy to keep and are also high in reproductive ability). However, mice are different, in body size, from rats. Due to such a difference, a larger number of mice can be kept per unit area and, indeed, a largest number of mice are kept as experimental animals.

In recent years, mice have been growing in importance as experimental animals, particularly, in the field of neuroscience. An important advantage of mice is that more genetic manipulations can be done in mice than in any other mammals. For example, mice are widely used as experimental animals so as to study cognition or emotion, analyze brain functionality, or tackle medical questions related to various neurological diseases including neuro-degenerative diseases.

Further, in recent years, use of a fixing device which fixes the head of an experimental animal has been becoming increasingly popular in the field of neuroscience. Such a head fixing device plays a key role in a large number of research topics ranging from, for example, studies of dynamics of dendritic spines at sub-micrometer scale to studies of dynamics of neuronal populations at millimeter scale.

CITATION LIST

Non-Patent Literature

[Non-Patent Literature 1]
Neuron. 2013 Oct. 16; 80(2):371-384

SUMMARY OF INVENTION

Technical Problem

Although both mice and rats are rodents, mice are different from rats in characteristics regarding handling. In general, rats are fairly easy to handle and train and are relatively tolerant to restraint. Therefore, an experiment in which the head of a rat is restrained with use of a head fixing device is relatively easily carried out, and even self-restraint to the head fixing device is relatively easily realized (Non-patent literature 1). On the other hand, mice are extremely scared of humans and are, therefore, difficult to handle or restrain, especially, difficult to handle or restrain in an experiment in which a head fixing device is used.

One of advantages of use of mice is, as described above, that high-throughput experiments can be carried out while a large number of mice are being kept. However, in experiments in which mice need to be restrained with use of restraining means such as a head fixing device, difficulty in restraining the mice is a big obstacle to achievement of high-throughput experiments. Still more, it has not been realized to restrain mice substantially without human interaction.

The present invention has been made in view of the above problems, and an object of the present invention is to realize a novel system for a mouse, the system being capable of (1) self-head restraining, (2) high-throughput, (3) automated behavioral training, (4) flexibility for many diverse training tasks, and (5) compatibility with cutting-edge optical technologies for brain studies (e.g. two-photon imaging, optogenetics). Another object of the present invention is to realize a novel system capable of restraining a mouse substantially without human interaction.

Solution to Problem

In order to attain the objects, the present invention includes at least one of the following aspects.

1) A system for restraining a mouse, comprising:
at least one home cage for keeping the mouse therein;
a passage through which the mouse moves, the passage having at least one first open end; and
a restraining device which restrains the mouse by physically fixing the mouse,
the at least one first open end of the passage being connected to the at least one home cage,
the restraining device being provided at a location on the passage which location is different from the at least one first open end of the passage.

2) The system described in 1), wherein the restraining device restrains the mouse by physically fixing a head plate with which the head of the mouse is equipped.

3) The system described in 2), further comprising a guide section which guides the head plate, the guide section being provided to the passage and having a part inclined upward or downward as extending toward the restraining device.

4) The system described in any one of 1) through 3), wherein: the passage has a second open end which is different from the at least one first open end; and the restraining device is provided on a second-open-end side of the passage.

5) The system described in any one of 1) through 4), further comprising a door which can be opened and closed, the door dividing an inner space of the passage into a first-open-end-side space and a restraining-device-side space in a case where the door is closed.

6) The system described in any one of 1) through 5), further comprising a sensor which detects a position of the mouse being inside the passage.

7) The system described in 6), wherein operation of the restraining device and/or operation of a/the door are/is automatically controlled in accordance with information on the position of the mouse, data of which position is obtained from an output of the sensor.

8) The system described in any one of 1) through 7), further comprising an activity data measuring device which obtains data on activity of the mouse restrained by the restraining device.

9) The system described in any one of 1) through 8), further comprising a learning device which supplies a reward to the mouse in association with predetermined movement of the mouse restrained by the restraining device.

10) The system described in 8) or 9), further comprising a control section which automatically controls operation of an/the activity data measuring device and/or operation of a/the learning device each of which operation is carried out with respect to the mouse restrained by the restraining device.

11) The system described in any one of 1) through 10), wherein:

the at least one first open end of the passage includes a plurality of first open ends;

the at least one home cage includes a plurality of home cages; and the plurality of first open ends are connected to the respective plurality of home cages.

Advantageous Effects of Invention

According to the present invention, it is possible to provide a novel system capable of relatively easily restraining a mouse.

DESCRIPTION OF EMBODIMENTS

Embodiment 1

Figure 1:
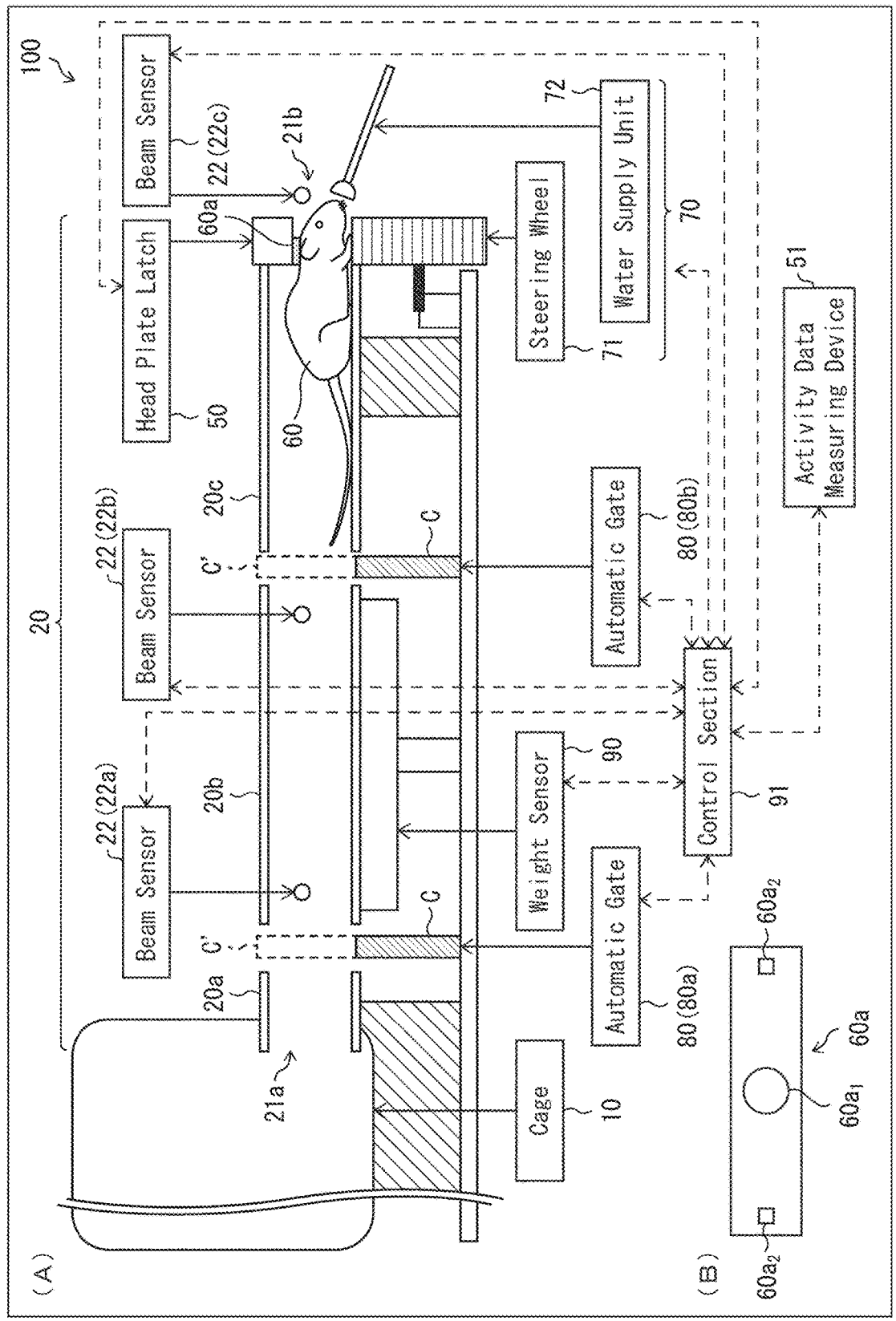
FIG. 1 is a view schematically illustrating a configuration of a system in accordance with Embodiment 1 of the present invention.

The following description will discuss, with reference to FIG. 1, a mouse restraining system in accordance with Embodiment 1 of the present invention.

A mouse restraining system 100 at least includes: a home cage 10 for keeping a mouse 60 therein; a passage 20 through which the mouse 60 moves; and a head plate latch (restraining device) 50 which restrains the mouse 60.

One or a plurality of mouse/mice 60 is/are housed in the home cage 10 depending on a capacity of the home cage 10. In a case where the plurality of mice 60 are housed in the home cage 10, 20 or less mice 60, preferably 10 or less mice 60, more preferably 4 or less mice 60 are, for example, housed in the home cage 10 depending on the capacity of the home cage 10. As necessary, equipment, such as a feeding place and a toilet, necessary to keep the mouse 60 is provided in the home cage 10. The home cage 10 has food pellets. Drinking water is possible only from a spout (water supply unit 72 (later described)) in a training system (i.e. water-controlled training paradigm).

(Passage 20)

The passage 20 is a hollow tubular structure through which the mouse 60 can move (hollow rectangular-solid-shaped structure in Embodiment 1). Both ends of the passage 20 are opened (hereinafter, one of the both ends will be referred to as an open end 21a (first open end) and the other one of the both ends will be referred to as an open end 21b (second open end)). The passage 20 is connected to the home cage 10 so that the mouse 60 can move from the home cage 10 to the passage 20 via the open end 21a. The head plate latch 50 is set in an open-end-21b side of the passage 20. This allows the mouse 60 to move between the head plate latch 50 and the home cage 10 through the passage 20. A cross-sectional area of an inner space of the passage 20 is not limited in particular, but preferably falls within a range of 7 $cm^2$ to 15 $cm^2$, preferably 9 $cm^2$ to 12 $cm^2$ so that the mouse 60 easily enters the passage 20 by choice. Further, a height at which the passage 20 is provided is not limited in particular, but the passage 20 is provided so that an internal lower surface of the passage 20 is located at a height of 1 cm to 6 cm, preferably 2 cm to 4 cm from an internal lower surface of the home cage 10. Such a difference in height between the internal lower surface of the passage 20 and the internal lower surface of the home cage 10 prevents a plurality of mice 60 from freely entering the passage 20 one after another.

The passage 20 is constituted by three portions, that is, a cage-side passage 20a, a middle passage 20b, and a latch-side passage 20c. Those portions have an identical structure, except that the portions are different in length from each other. The portions are concentrically arranged and connected with each other so as to constitute a single continuous passage 20. The cage-side passage 20a and the latch-side passage 20c are fixed to on an identical base. The middle passage 20b is supported from underneath by a weight sensor 90. The cage-side passage 20a has the open end 21a, and the latch-side passage 20c has the open end 21b. Information on a weight of the mouse 60 being inside the middle passage 20b, which weight is measured by the weight sensor 90, is supplied to a control section 91 and is used for automatically controlling operation of the mouse restraining system 100.

(Automatic Gate 80)

The mouse restraining system 100 includes two automatic gates (door) 80a and 80b (which may be collectively referred to as an automatic gate 80) each of which is movable upward and downward. The automatic gate 80a is located so that the cage-side passage 20a and the middle passage 20b are connected to each other via the automatic gate 80a. In a case where the automatic gate 80a is opened, an upper surface of the automatic gate 80a, an internal lower surface of the cage-side passage 20a, and an internal lower surface of the middle passage 20b are arranged at the same level so as to constitute the internal lower surface of the passage 20 (see a state indicated by "C" illustrated in FIG. 1). In a case where the automatic gate 80a is closed, the automatic gate 80a is raised so as to be inserted between the cage-side passage 20b and the middle passage 20b. This causes the inner space of the passage 20 to be divided into an open-end-21a-side space and a head-plate-latch-50-side space (see a state indicated by "C'" illustrated in FIG. 1).

Similarly, the automatic gate 80b is located so that the middle passage 20b and the latch-side passage 20c are connected to each other via the automatic gate 80b. In a case where the automatic gate 80b is opened, an upper surface of the automatic gate 80b, the internal lower surface of the middle passage 20b, and an internal lower surface of the latch-side passage 20c are arranged at the same level so as to constitute the internal lower surface of the passage 20 (see the state indicated by "C" illustrated in FIG. 1). In a case where the automatic gate 80b is closed, the automatic gate 80b is raised so as to be inserted between the middle passage 20b and the latch-side passage 20c. This causes the inner space of the passage 20 to be divided into the open-end-21a-side space and the head-plate-latch-50-side space (see that state indicated by "C'" illustrated in FIG. 1).

(Beam Sensor 22)

The mouse restraining system 100 includes a plurality of beam sensors 22 each of which detects a position of the mouse 60 being inside the passage 20. Each of the plurality of beam sensors 22 has an irradiation source and a beam receiving device which locates at an opposite side of the irradiation source. The irradiation source of the each of the plurality of beam sensors 22 emits a beam toward the beam receiving device to detect a position of the mouse 60. A beam sensor 22a is set near the cage-side passage 20a. This allows monitor of entrance of the mouse 60 into the middle passage 20b. A beam sensor 22b is set in the middle passage 20b. This allows monitor of passage of the mouse 60 through the middle passage 20b. A beam sensor 22c is set near the head plate latch 50. This allows monitor of arrival of the mouse 60 at the head plate latch 50. Information on the position of the mouse 60, data of which position is obtained from each output of the plurality of beam sensors 22, is supplied to the control section 91 and is used for automatically controlling the operation of the mouse restraining system 100.

(Head Plate Latch 50)

The head plate latch 50 restrains the mouse 60 by physically fixing a head plate 60a with which the head of the mouse 60 is equipped. A size of the head plate 60a in combination with (1) a size of the passage 20, (2) a geometry of a latching mechanism, make it impossible for the mouse 60 to escape from the head plate latch 50. The head plate 60a has (i) a through window $60a_1$ in its middle in a longitudinal direction and (ii) recesses $60a_2$ and $60a_2$ at its respective both ends in the longitudinal direction. The head plate latch 50 has, for example, downward protrusions which are shaped so as to fit to the respective recesses $60a_2$ and $60a_2$ of the head plate 60a. In a case where the head plate latch 50 is lowered, the protrusions fit to the respective recesses $60a_2$ and $60a_2$ of the head plate 60a so that the mouse 60 is restrained. In a case where the head plate latch 50 is raised, the mouse 60 is released from restraint. In an alternative configuration, the head plate latch 50 comes into contact with a side surface of the head plate 60a with which the head of the mouse 60 is equipped. This causes the head plate 60a to be fixed so that the mouse 60 cannot move back. This will be later described in detail with reference FIG. 3.

(Activity Data Measuring Device 51)

The mouse restraining system 100 further includes an activity data measuring device 51 which obtains data on activity (activity data) of the mouse 60 whose head is restrained by the head plate latch 50. The activity data measuring device 51 can be any device that is used for various observations in each of which a mouse equipped with a head plate is an observation object. Examples of the activity data measuring device 51 encompass: a microscope device such as an optical microscope; a macroscope device such as optical macroscope; an electroencephalography device; electrodes for physiological recordings; and optic fibers for ontogenetic stimulation. The activity data measuring device 51 obtains a brain wave of the mouse 60 (in a case where an electroencephalography device serves as the activity data measuring device 51), a microscope image or a macroscope image of an inside of the brain of the mouse 60 (in a case where a microscope device or a macroscope device serves as the activity data measuring device 51), or the like as the activity data via the through window $60a_1$ of the head plate 60a.

(Water supply Unit 72, Steering Wheel 71)

The mouse restraining system 100 further includes, on a side of the open end 21b, a water supply unit (which also serves as a device which supplies an attractant) 72 and a steering wheel (which also serves as a device which receives movement of the mouse 60). For example, in a case where the mouse 60 restrained by the head plate latch 50 makes predetermined movement (e.g., the mouse 60 rotates the steering wheel 71), the water supply unit 72 supplies a predetermined amount of water to the mouse 60. That is, the water supply unit 72 and the steering wheel 71 function as a learning device 70 which supplies water to the mouse 60 as a reward in association with the predetermined movement of the mouse 60 restrained by the head plate latch 50. The water supply unit 72 supplies, as another example, a predetermined amount of water (attractant) to the mouse 60 so that the mouse 60 is attracted to the head plate latch 50.

(Control Section 91)

The control section 91 automatically or semi-automatically controls the operation of the mouse restraining system 100. According to the mouse restraining system 100, the control section 91 is connected, by wire or wireless, to each of the plurality of beam sensors 22, the automatic gate 80, the weight sensor 90, the head plate latch 50, the activity data measuring device 51, the steering wheel 71, and the water supply unit 72. The control section 91 is accordingly capable of supplying/receiving information to/from each of those devices. With this configuration, for example, the control section 91 automatically controls operation of the head plate latch 50 and/or operation of the automatic gate 80 in accordance with the information on the position of the mouse 60, the data of which position is obtained from each output of the plurality of beam sensors 22. Alternatively, the control section 91 automatically controls operation of the activity data measuring device 51 and/or operation of the learning device 70 (the water supply unit 72 and the steering wheel 71), each of which operation is carried out with respect to the mouse 60 restrained by the head plate latch 50.

Note that the control section 91 can be performed by a logic circuit (hardware) provided in an integrated circuit (IC chip) or the like or can be alternatively performed by software as executed by a CPU (Central Processing Unit). Further, the control section 91 can be configured such that (i) the control section 91 is constituted by a plurality of blocks and (ii) each of the plurality of blocks controls operation of a corresponding one of different devices (devices constituting the mouse restraining system 100).

Examples of how the control section 91 controls the operation of the mouse restraining system 100 will be described below in detail. Note, however, that how the control section 91 controls the operation of the mouse restraining system 100 is not limited to the examples in particular. Such operation control allows realization of a novel system capable of restraining a mouse substantially without human interaction (that is, system capable of effectively restraining a mouse while suppressing the mouse's fear). Furthermore, by increasing the number of mice housed in the home cage 10, it is possible to easily achieve a high throughput experiment.

<Aspect 1> Screening of Mouse to be Guided to Head Plate Latch 50

First, the control section 91 controls operation of opening of the automatic gates 80a and 80b so that the mouse 60 can freely move between the home cage 10 and the passage 20. In a case where the beam sensor 22a detects entrance of the mouse 60 into the middle passage 20b, the control section 91 controls operation of closing of the automatic gates 80a and 80b. Then, the weight sensor 90 automatically measures the weight of the mouse 60 being inside the middle passage 20b. In a case where the weight of the mouse 60, which weight has been automatically measured by the weight sensor 90, meets a predetermined criterion, the control section 91 controls the operation of the opening of the automatic gate 80b, while controlling the automatic gate 80a to remain closed, so that the mouse 60 can move to the head plate latch 50 (to the latch side passage 20c). In a case where the beam sensor 22b detects movement of the mouse 60 to the head plate latch 50, the control section 91 controls the operation of the closing of the automatic gate 80b again. On the other hand, in a case where the weight of the mouse 60 does not meet the predetermined criterion, the control section 91 controls the operation of the opening of the automatic gate 80a, while controlling the automatic gate 80b to remain closed, so that the mouse 60 can move back to the home cage 10. That is, according to Aspect 1, the control section 91 automatically controls the operation of the opening and closing of the automatic gate 80 with use of (i) the information on the position of the mouse 60, the data of which position is obtained from each output of the plurality of beam sensors 22, and (ii) the information on the weight of the mouse 60, data of which weight is obtained from an output of the weight sensor 90. According to the mouse restraining system 100, it is thus possible to automatically carry out screening of a mouse, to be guided to the head plate latch 50, by a weight of the mouse.

<Aspect 2> Training in Habituation to Head Plate Latch 50

First, the control section 91 controls the operation of the opening of the automatic gates 80a and 80b so that the mouse 60 can freely move between the home cage 10 and the passage 20. In a case where the beam sensor 22b detects entrance of the mouse 60 into the latch-side passage 20c, the control section 91 can control the operation of the closing of the automatic gate 80b or can alternatively control the operation of the opening of the automatic gate 80b to remain opened. The control section 91 controls, as necessary, the operation of the water supply unit 72 to continuously supply the predetermined amount of water to the mouse 60 at a predetermined time (for example, a time at which the beam sensor 22a detects the mouse 60) so that the mouse 60 is attracted to the head plate latch 50. In a case where the beam sensor 22c detects movement of the mouse 60 to a region in which the head plate latch 50 can fix the head plate 60a, the control section 91 controls the operation of the movement of the head plate latch 50 so as to fix the head plate 60a. This causes the mouse 60 to be restrained so as not to move. Note that the head plate 60a can be softly fixed by the head plate latch 50 so that the mouse 60 becomes used to the head plate latch 50. Next, after elapse of a predetermined time, the control section 91 controls (i) the operation of the movement of the head plate latch 50 to release the head plate 60a from a fixed state and (ii) the operation of the opening of the automatic gates 80a and 80b relative to the operation (i) so that the mouse 60 can move back to the home cage 10. By carrying out such control once or preferably repeatedly with respect to an identical mouse 60, it is possible to cause the mouse 60 to gradually become used to the head plate latch 50. In a case where a plurality of mice 60 are kept in the home cage 10, it is possible to automatically and simultaneously train the plurality of mice 60 so that the plurality of mice 60 are habituated to the head plate latch 50.

That is, according to Aspect 2, the control section 91 automatically controls the operation of the opening and the closing of the automatic gate 80, water supply operation of the water supply unit 72, and fixation and release operation of the head plate latch 50 in accordance with (i) the information on the position of the mouse 60, the data of which position is obtained from each output of the plurality of beam sensors 22, and (ii) information on a interrelationship between operation of one device and operation of another device (between the operation of the head plate latch 50 and the operation of each of the automatic gates 80a and 80b).

Note that a mouse to be conducted to the habituation training can be automatically selected by a weight of the mouse with use of the method described in <Aspect 1>.

<Aspect 3> Learning Training~Obtainment of Data on Activity of Mouse

First, the control section 91 controls the operation of the opening of the automatic gates 80a and 80b so that the mouse 60 can freely move between the home cage 10 and the passage 20. In a case where the beam sensor 22b detects entrance of the mouse 60 into the latch-side passage 20c, the control section 91 preferably controls the operation of the closing of the automatic gate 80b. In a case where the beam sensor 22c detects movement of the mouse 60 into the region in which the head plate latch 50 can fix the head plate 60a, the control section 91 controls the operation of the movement of the head plate latch 50 so as to fix the head plate 60a. This causes the mouse 60 to be restrained so as not to move. Note that the head plate 60a can be softly fixed by the head plate latch 50 so that the mouse 60 becomes used to the head plate latch 50. The water supply unit 72 and the steering wheel 71 constitute the learning device 70. In a case where the mouse 60 restrained by the head plate latch 50 makes the predetermined movement, for example, rotates the steering wheel 71, the control section 91 controls the operation of the water supply unit 72 to supply water (reward) to the mouse 60 in association with the predetermined movement of the mouse 60. Next, the control section 91 controls (i) the operation of the movement of the head plate latch 50 to release the head plate 60a from a fixed state and (ii) the operation of the opening of the automatic gates 80a and 80b relative to the operation (i) so that the mouse 60 can move back to the home cage 10. By carrying out such control once or preferably repeatedly with respect to an identical mouse 60, it is possible to cause the mouse 60 to learn that, by making the predetermined movement, for example, rotating the steering wheel 71, the mouse 60 can obtain water from the water supply unit 72. In a case where a plurality of mice 60 are kept in the home cage 10, it is possible to automatically and simultaneously carry out learning training with respect to the plurality of mice 60.

In addition, data on the activity of the mouse 60 restrained by the head plate latch 50 can be obtained with use of the activity data measuring device 51. Such activity data is preferably obtained from the mouse 60 which has been subjected to the learning training.

That is, according to Aspect 3, the control section 91 automatically controls the operation of the opening and the closing of the automatic gate 80, the water supply operation of the water supply unit 72, measurement operation of the activity data measuring device 51, and the fixation and release operation of the head plate latch 50 in accordance with (i) the information on the position of the mouse 60, the data of which position is obtained from each output of the plurality of beam sensors 22, (ii) an output of the steering wheel 71 (output resulting from rotation of the steering wheel 71 which rotation is caused by the mouse 60), or (iii) the information on a interrelationship between operation of one device and operation of another device (for example, between the operation of the head plate latch 50 and the operation of each of the automatic gates 80*a* and 80*b*, between the operation of the water supply unit 72 and the operation of the steering wheel 71, between the operation of the head plate latch 50 and the operation of the activity data measuring device 51, and the like).

Note that a mouse to be conducted to the learning training can be automatically selected by a weight of the mouse with use of the method described in <Aspect 1>.

(Variation of Mouse Restraining System)

The mouse restraining system 100 can include, instead of the steering wheel 71 illustrated in FIG. 1, another device which receives the movement of the mouse 60.

Further, a reward/attractant supply unit which supplies a mouse with feed or the like as a reward or an attractant can be used instead of the water supply unit 72 illustrated in FIG. 1. In a case that the mouse is fed, the reward/attractant supply unit serves as a feeding unit. In this case, the above mentioned movement receiving device and the reward/attractant supply unit constitutes the learning device 70 for a mouse.

The mouse restraining system 100 can be configured such that (i) the control section 91 illustrated in FIG. 1 is omitted or a range of automatic control carried out by the control section 91 is limited and (ii) at least part of the devices constituting the mouse restraining system 100 is manually operated. Even with this configuration, since the home cage 10 is connected to the passage 20, to which the head plate latch 50 is provided, it is possible to relatively easily restrain the mouse 60 with use of the head plate latch 50 while suppressing the human interaction so as to reduce the mouse 60's fear. Note, however, that the control section 91 preferably 1) automatically controls at least the operation of the head plate latch 50 and/or the operation of the automatic gate 80 in accordance with the information on the position of the mouse 60, the data of which position is obtained from each output of the plurality of beam sensors 22, or 2) automatically controls at least the operation of the activity data measuring device 51 and/or the operation of the learning device 70, each of which operation is carried out with respect to the mouse 60 restrained by the head plate latch 50. This is because it is possible to further suppress the human interaction, thereby improving work efficiency and further reducing the mouse 60's fear.

Note that, in consideration of only a purpose of causing the mouse 60 to become used to fixation by the head plate latch 50, the mouse restraining system 100 only needs to include at least the home cage 10, the passage 20, and the head plate latch 50 out of the devices illustrated in FIG. 1, and the other devices are not essential.

Embodiment 2

Figure 2:
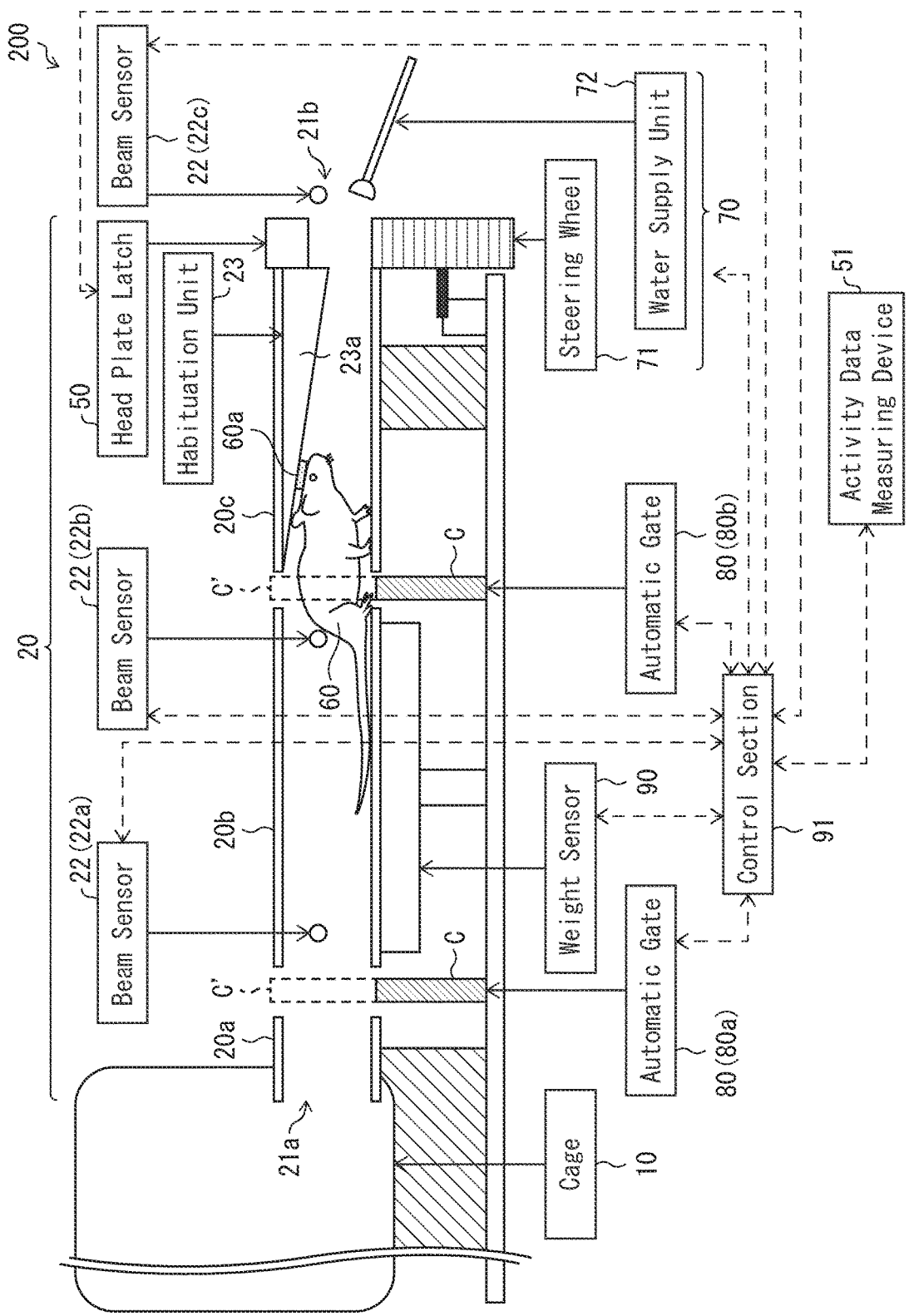
FIG. 2 is a view schematically illustrating a configuration of a system in accordance with Embodiment 2 of the present invention.

The following description will discuss, with reference to FIG. 2, a mouse restraining system in accordance with another embodiment of the present invention. Note that identical reference numerals will be given to members identical to those illustrated in FIG. 1, and the members will not be explained here.

A mouse restraining system 200 illustrated in FIG. 2 is different from the mouse restraining system 100 illustrated in FIG. 1 in inner structure of a latch-side passage 20*c*. In particular, the mouse restraining system 200 includes a habituation unit 23 (guide section for guiding a head plate) which comprises plate-shaped components attached on respective internal side surfaces of the latch-side passage 20*c*. Each of the plate-shaped components has an inclined part (guide rail) 23*a* which is inclined downward as extending from its home-cage-10 side to its head-plate-latch-50 side.

The habituation unit 23 functions as a guide section which increases control on upward movement of a mouse 60 in stages (gradually reduces a degree of freedom of the upward movement of the mouse 60) as a head plate 60*a* with which the mouse 60 is equipped comes into contact with the inclined part 23*a* and the mouse 60 becomes closer to a head plate latch 50. Note, however, that the habituation unit 23 does not prevent the mouse 60 from accessing the head plate latch 50, a water supply unit 72, and a steering wheel 71. This makes it possible to (i) more easily restrain the mouse 60 with use of the head plate latch 50 while suppressing a rapid increase in mouse 60's fear or (ii) more easily cause the mouse 60 to become used to fixation by the head plate latch 50.

(Variation of Habituation Unit)

Figure 3:
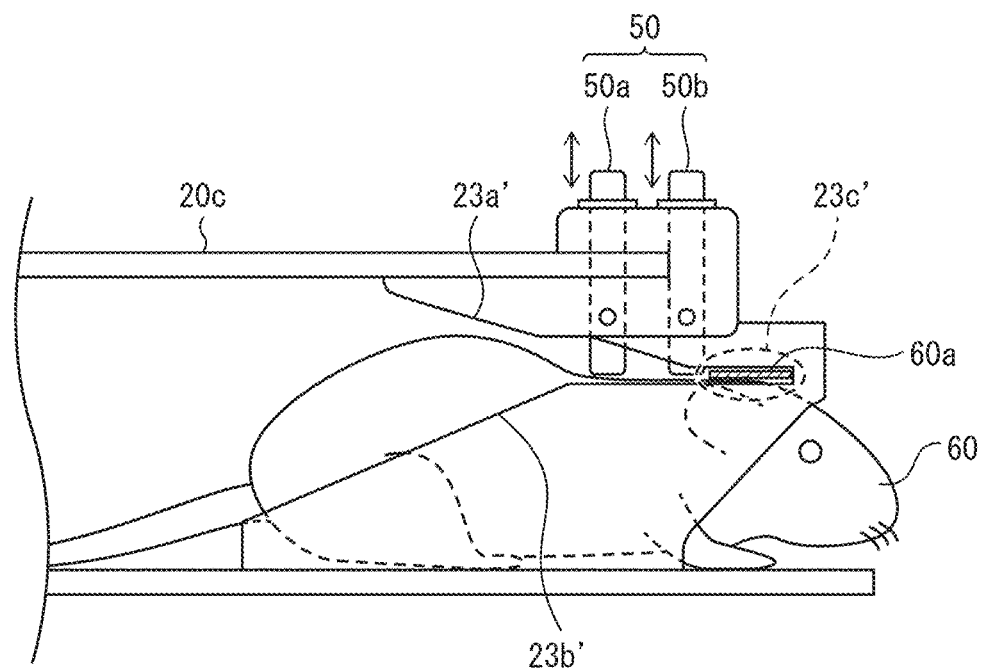
FIG. 3 is a view illustrating a main part of a configuration of a variation of the system in accordance with each of Embodiments 1 and 2 of the present invention.

A habituation unit 23' illustrated in FIG. 3 can be used instead of the habituation unit 23 illustrated in FIG. 2. The habituation unit 23' has plate-shaped components attached on the respective internal side surfaces of the latch-side passage 20*c*. Each of the plate-shaped components has (i) an inclined part (guide rail) 23*a*' which is inclined downward as extending from its home-cage-10 side to its head-plate-latch-50 side and (ii) an inclined part (guide rail) 23*b*' which is inclined upward as extending from its home-cage-10 side to its head-plate-latch-50 side. On the head-plate-latch-50 side, the inclined parts 23*a*' and 23*b*' form a parallel part 23*c*' (restraining groove) by extending in parallel toward the head plate latch 50 while having therebetween a predetermined gap with which the head plate 60*a* is engaged (for example, a space which is slightly larger than a thickness of the head plate 60*a*). An end of the parallel part 23*c*' located on its head-plate-latch-50 side is closed. That is, the inclined part 23*a*' and the inclined part 23*b*' constitute a substantially Y-shaped guide section, and increase control on upward and downward movement of the mouse 60 in stages as the head plate 60*a* with which the mouse 60 is equipped comes into contact with the inclined part 23*a*' and the inclined part 23*b*' and the mouse 60 becomes closer to the head plate latch 50. In a case where the head plate 60*a* is engaged with the parallel part 23*c*', the mouse 60 cannot substantially move upward or downward. However, such engagement does not prevent the mouse 60 from accessing the water supply unit 72 and the steering wheel 71. In such a state, since a rapid increase in mouse 60's fear is suppressed, it is possible to more easily restrain the mouse 60 with use of the head plate latch 50. Here, the head plate latch 50 includes a first latching bar 50*a* and a second latching bar 50*b*. The first and the second latching bars 50*a* and 50*b* are provided so that a lower end of each of the first and the second latching bars 50*a* and 50*b* is located in the parallel part 23*c*' of the habituation unit 23', when viewed from a direction of a side surface of a passage 20. The first latching bar 50*a* is provided on an upstream side (home-cage-10 side) of the passage 20, and the second latching bar 50*b* is provided slightly downstream from the first latching bar 50*a* so that the first and the second latching bars 50*a* and 50*b* are spaced out. In a case where the mouse 60 moves forward, the head plate 60a comes into contact with the lower end of the first latching bar 50a so that the first latching bar 50a is pushed up. The first latching bar 50a goes back down (by gravity) as the mouse 60 keeps on moving forward. In a case where the first latching bar 50a goes back down, the first latching bar 50a comes into contact with a side surface of the head plate 60a which side surface is located on a rear side of the head plate 60a. This causes the head plate 60a to be fixed so that the mouse 60 cannot move back. In a case where the mouse 60 further moves forward, the second latching bar 50b is pushed up and then goes back down, as with the case of the first latching bar 50a. As a result, the second latching bar 50b restrains the head plate 60a to the very end of the parallel part 23c' (narrowing guide rails), where no degrees of freedom are allowed, of the habituation unit 23'. At the end of a training session, a servo-motor mechanism (not illustrated) lifts up both the first and the second latching bars 50a and 50b to let the mouse 60 return to the home cage 10. This dual latching system is one of keys to quickly train a mouse to self-head-latch: a mouse, after passing the first latching bar 50a, although fairly restrained by the habituation unit 23' (guide section), can still move its head and body, which greatly reduces its stress level.

Note that the habituation unit 23' illustrated in FIG. 3 can be configured so as not to have the inclined part 23a' and so as to include merely the inclined part 23b'. This also makes it possible to increase control on downward movement of the mouse 60 in stages as the head plate 60a with which the mouse 60 is equipped comes into contact with the inclined part 23b' and the mouse 60 becomes closer to the head plate latch 50.

Embodiment 3

The mouse restraining system illustrated in each of FIGS. 1 through 3 can be configured such that: 1) a plurality of home cages 10 are provided therein; 2) a passage 20 having a plurality of open ends 21a (first open ends) the number of which is identical to that of the plurality of home cages 10 (for example, a passage 20 whose one end is branched depending on the number of the plurality of home cages 10) or passages 20 the number of which is identical to that of the plurality of home cages 10 is/are provided therein; and 3) such plurality of open ends 21a are connected to the respective plurality of home cages 10.

This allows an increase in number of mice 60 which can be introduced to a head plate latch 50, in proportion to the number of the plurality of home cages 10. It is therefore possible to achieve a high throughput experiment.

Figure 4:
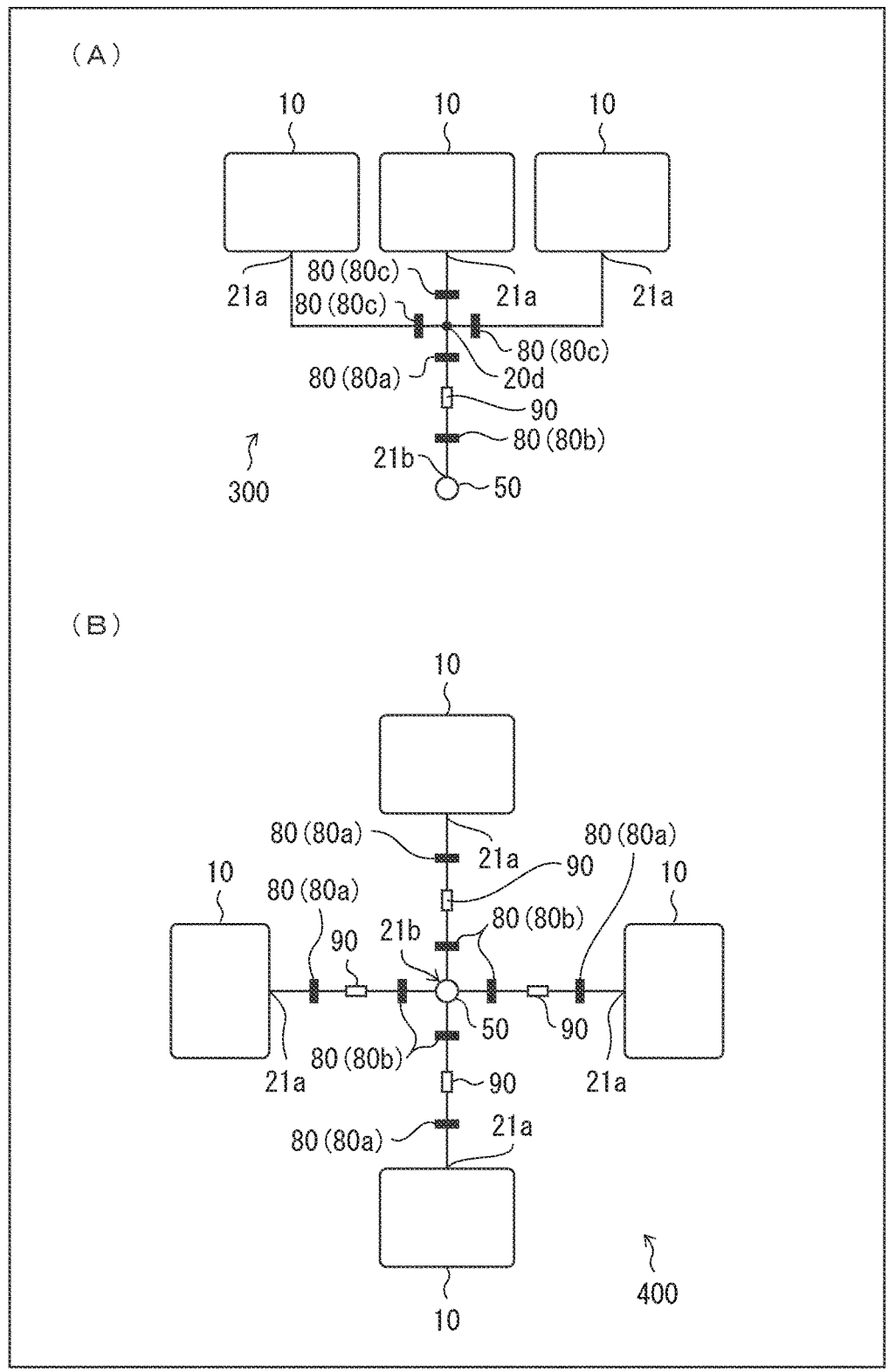
FIG. 4 is a view illustrating a main part of a configuration of a system in accordance with Embodiment 3 of the present invention.

For example, (A) of FIG. 4 schematically illustrates a configuration of a mouse restraining system 300 including: n (n is an integer of 2 or more) home cages 10 (in (A) of FIG. 4, three home cages 10 are provided); a passage 20 branched so as to have n open ends 21a on its respective home-cage-10 sides; and a single common head plate latch 50. A side of the passage 20 on which side the head plate latch 50 is provided is not branched, and the passage 20 has a single open end 21b. The mouse restraining system 300 includes automatic gates 80c in addiction to automatic gates 80a and 80b (see also FIGS. 1 and 2). The automatic gates 80c are provided in respective regions that are located on respective parts of the passage 20 which parts extend from a branching point 20d of the passage 20 to the respective open ends 21a and that are located in respective vicinities of the branching point 20d. Opening and closing of the automatic gates 80c are controlled as follows. That is, for example, one of the automatic gates 80c is controlled to be opened, while the other ones of the automatic gates 80c are controlled to be closed, so that a mouse 60 can move to the head plate latch 50 merely from a selected one of the home cages 10.

(B) of FIG. 4 schematically illustrates a configuration of a mouse restraining system 400 including: n (n is an integer of 2 or more) home cages 10 (in (B) of FIG. 4, four home cages 10 are provided); n passages 20; and a single common head plate latch 50. Open ends 21a of the passages 20 are connected to the respective different home cages 10 and all of open ends 21b of the passages 20 are connected to the common head plate latch 50. Opening and closing of a plurality of automatic gates 80 are controlled so that a mouse 60 is sent to the head plate latch 50 merely from a selected one of the home cages 10.

Note that, in FIG. 4, identical reference numerals are given to members identical to those illustrated in FIGS. 1 and 2 and the members will not be explained here.

The present invention is not limited to the embodiments, but can be altered by a skilled person in the art within the scope of the claims. An embodiment derived from a proper combination of technical means each disclosed in a different embodiment is also encompassed in the technical scope of the present invention.

EXAMPLES

Hereinafter, the present invention will be described more specifically by way of Examples, but the scope of the present invention is not intended to be limited to the following Examples

[Example 1] Physiological Recording and Brain Imaging from a Head-Fixed Mouse Trained in the Invented Setup A system for measuring activities of a CaMKII-cre:LSL-GCaMP3 mouse was set up. The system includes a fluorescence macroscope, an eye-tracking camera, an LCD display to present visual stimuli to the animal, a head-latching stage identical to that of the training system illustrated in FIG. 3. The mouse was kept and trained at the system. First, a dorsal cortex of a transgenic mouse was monitored to obtain a fluorescent image of chronic wide-field (FIG. 5(A), Red lines, contours of 8 visual areas including a primary visual cortex, V1).

At the same time as the dorsal cortex was imaged, a contra-lateral eye was imaged as well at high magnification under infra-red illumination. In this specific experiment, fluorescent signals, which reflected neural activations, were acquired as stimuli were presented on a screen placed in front of the animal. The task was to discriminate two visual stimuli, hence it was critical to control for eye movements. The trained animal performed at ~80% correct rate. Eye images were processed by an automated-segmentation algorithm which identified eye contours (green oval) and pupil (yellow circle) (FIG. 5(B)).

Figure 5:
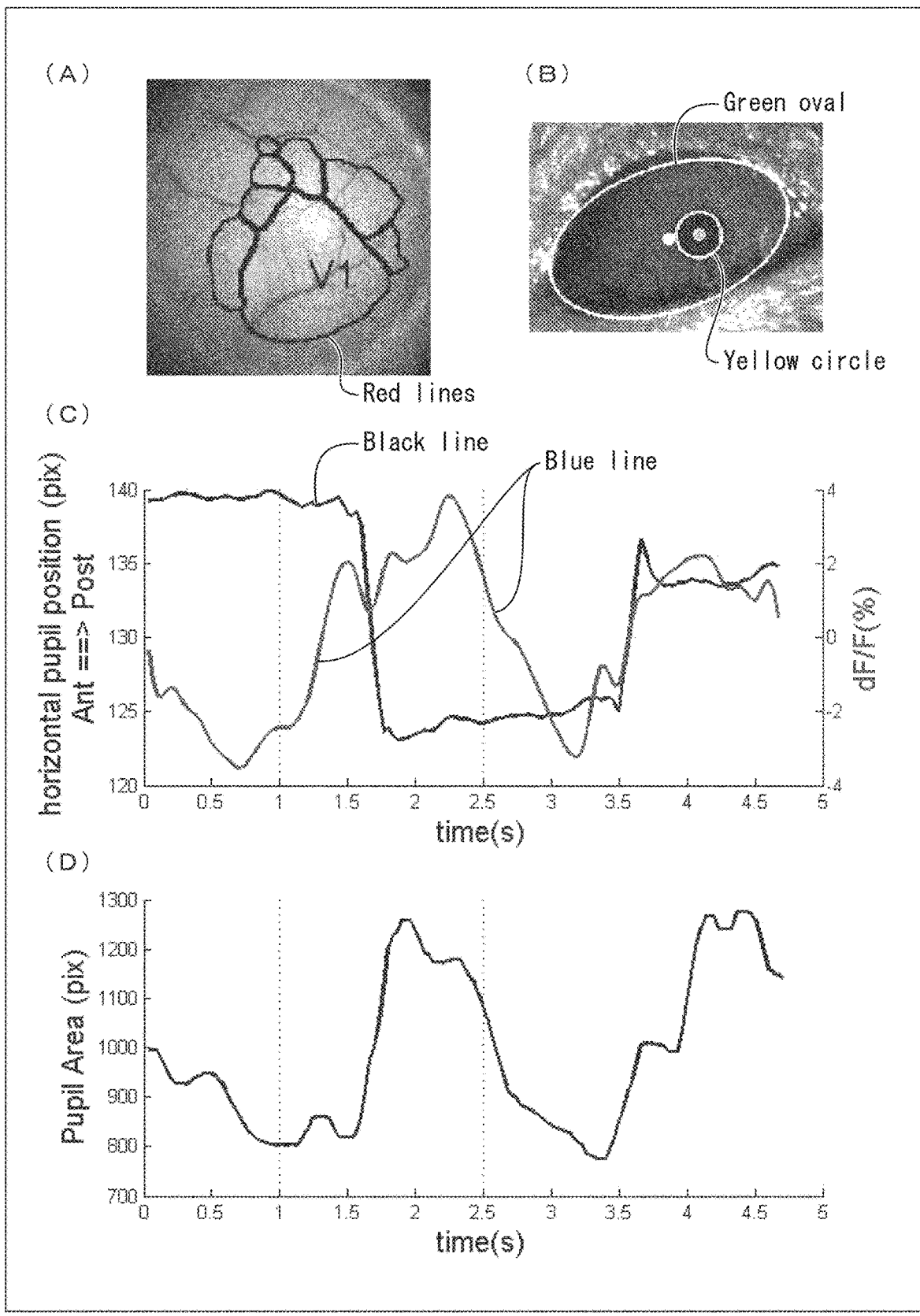
FIG. 5 is a view illustrating results of physiological recording and brain imaging from a head-fixed mouse trained in the invented system, the physiological recording and the brain imaging having been carried out in Example 1.

Horizontal pupil displacement calculated from FIG. 5(B) is shown in arbitrary pixel units (black line, left y-axis) together with fluorescent activations from V1 (blue line, right y-axis). Vertical dotted lines, time interval during which the animal could form a decision, but could not signal it. After t=2.5 s the animal could signal his choice via forepaws movements on a mechanical actuators (FIG. 5(C)). Temporal evolution of a pupil diameter (arbitrary pixel units) calculated using the segmentation algorithm, as shown in FIG. 5 (B), plotted on the same temporal axis as the neural recordings (FIG. 5(D)).

REFERENCE SIGNS LIST home cage 10
passage 20
cage-side passage 20a
middle passage 20b
latch-side passage 20c
open end 21a
open end 21b
beam sensor 22
beam sensor 22a
beam sensor 22b
beam sensor 22c
branching point 20d
habituation unit 23
inclined part 23a
habituation unit 23'
inclined part 23a'
inclined par 23b'
parallel part 23c' (restraining groove)
head plate latch (restraining device) 50
first latching bar 50a
second latching bar 50b
activity data measuring device 51
mouse 60
head plate 60a
through window $60a_1$
recesses $60a_2$ and $60a_2$
learning device 70
steering wheel 71
water supply unit 72
automatic gate 80
automatic gates (door) 80a and 80b
automatic gates 80c
weight sensor 90
control section 91
mouse restraining system 100
mouse restraining system 200
mouse restraining system 300
mouse restraining system 400

The invention claimed is:

1. A system for a mouse to self-restrain his body and head, comprising:
at least one home cage for keeping the mouse therein;
a passage through which the mouse moves, the passage having at least one first open end; and
a restraining device where the mouse can physically restrain himself, the at least one first open end of the passage being connected to the at least one home cage,
the restraining device being provided at a location on the passage different from the location of the at least one first open end,
the restraining device allowing the mouse to self-restrain himself by physically fixing a head plate with which the head of the mouse is equipped,
the restraining device including a latching bar,
the head plate coming into contact with a lower end of the latching bar so that the latching bar is pushed up when the mouse moves forward, and the latching bar going back down by gravity as the mouse keeps on moving forward,
wherein the latching bar includes a first latching bar and a second latching bar, the second latching bar being provided downstream from the first latching bar so that the first latching bar and the second latching bar are spaced out;
wherein the head plate comes into contact with a lower end of the first latching bar so that the first latching bar is pushed up when the mouse moves forward, and the first latching bar goes back down by gravity as the mouse keeps on moving forward; and
wherein the head plate comes into contact with a lower end of the second latching bar so that the second latching bar is pushed up as the mouse keeps on moving forward, and the second latching bar goes back down by gravity as the mouse keeps on moving forward;
said system further comprises a guide section which guides the head plate, the guide section being provided to the passage and having a part inclined upward or downward as extending toward the restraining device;
1) the guide section is provided on a restraining-device side and constitutes a substantially Y-shaped guide section which has
   (i) an inclined part which is inclined upward as extending toward the restraining device,
   (ii) an inclined part which is inclined downward as extending toward the restraining device, and
   (iii) extending parts which extend in parallel while having therebetween a predetermined gap with which the head plate is engaged;
wherein the first and second latching bars are provided so that a lower end of each of the first and second latching bars is located in the substantially Y-shaped guide section viewing from a direction of a side surface of the passage.

2. The system as set forth in claim 1, wherein: the passage has a second open end at a location different from the location of the at least one first open end; and the restraining device is provided on a second-open-end side of the passage.

3. The system as set forth in claim 1, further comprising:
1) an activity data measuring device which obtains data on activity of the mouse restrained by the restraining device; and/or
2) a learning device which supplies a reward to the mouse in association with predetermined movement of the mouse restrained by the restraining device.

4. The system as set forth in claim 3, further comprising a control section which automatically controls operation of the activity data measuring device and/or operation of the learning device each of which operation is carried out with respect to the mouse restrained by the restraining device.

5. The system as set forth in claim 1, further comprising a door which can be opened and closed, the door dividing an inner space of the passage into a first-open-end-side space and a restraining-device-side space in a case where the door is closed.

6. The system as set forth in claim 5, wherein operation of the restraining device and/or operation of the door is automatically controlled in accordance with information on the position of the mouse, data of which position is obtained from an output of a sensor.

7. The system as set forth in claim 1, wherein:
the at least one first open end of the passage includes two or more first open ends;
the at least one home cage includes two or more home cages; and
the plurality of first open ends are connected to the respective two or more home cages.

* * * * *